(12) United States Patent
Kuno et al.

(10) Patent No.: US 7,312,825 B1
(45) Date of Patent: Dec. 25, 2007

(54) SOLID-STATE IMAGE PICK DEVICE HAVING A TIMING PULSE GENERATOR, AND METHOD FOR REPLACING SIGNALS FROM A SWITCH

(75) Inventors: Yoshinori Kuno, Kanagawa (JP); Masahide Hirama, Kanagawa (JP); Toshimitsu Nagae, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/306,813

(22) Filed: May 7, 1999

(30) Foreign Application Priority Data

May 12, 1998 (JP) .............................. P10-128370

(51) Int. Cl.
*H04N 3/14* (2006.01)
(52) U.S. Cl. ...................................... 348/312; 348/324
(58) Field of Classification Search ................. 348/311, 348/312, 320, 324, 322, 265, 316, 317, 319, 348/321, 323
See application file for complete search history.

(56) References Cited

U.S. PATENT DOCUMENTS

| | | | | |
|---|---|---|---|---|
| 4,507,684 A | * | 3/1985 | Battson | 348/317 |
| 4,875,101 A | * | 10/1989 | Endo et al. | 348/314 |
| 5,796,432 A | * | 8/1998 | Iesaka et al. | 348/311 |
| 5,814,810 A | * | 9/1998 | Anagnostopoulos | 250/208.1 |
| 5,907,357 A | * | 5/1999 | Maki | 348/312 |
| 5,973,736 A | * | 10/1999 | Kawamoto et al. | 348/324 |
| 5,986,702 A | * | 11/1999 | Maki | 348/241 |

FOREIGN PATENT DOCUMENTS

| JP | 08-172505 | 7/1996 |
|---|---|---|
| JP | 09-247354 | 9/1997 |

\* cited by examiner

*Primary Examiner*—Vivek Srivastava
*Assistant Examiner*—Justin Misleh
(74) *Attorney, Agent, or Firm*—Robert J. Depke; Rockey, Depke, Lyons & Kitzinger LLC.

(57) ABSTRACT

A solid state image pickup device being provided with a photoelectric converter portion being composed of a plurality of pixels disposed in a row, a charge transfer portion for transferring the charges generated in the photoelectric converter portion, and a charge/voltage converter portion for converting the charges transferred by the charge transfer portion into voltages, comprising; a timing pulse generator portion for generating at least more than one pulse signal from among the followings: a first pulse signal for driving the charge transfer portion, a second pulse signal for reading out the charges generated in the photoelectric converter portion, a third pulse signal for sweeping out the charges generated in the photoelectric converter portion and a fourth pulse signal for discharging the charges transferred to the charge/voltage converter portion, and a switch circuit for switching over at least one pulse signal out of the above-mentioned pulse signals to a predetermined fixed potential or a floating level.

8 Claims, 3 Drawing Sheets

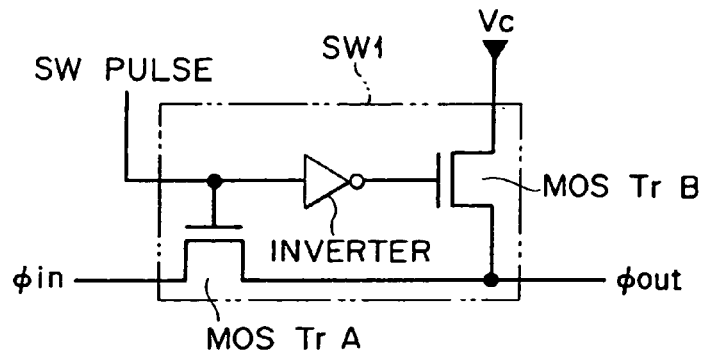
FIG. 2A
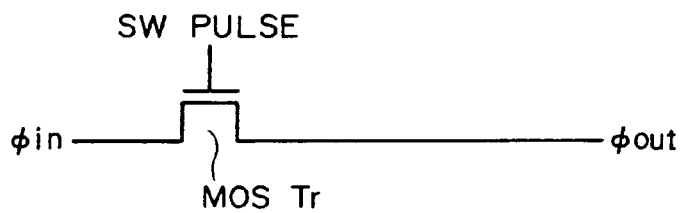
FIG. 2B
FIG. 3
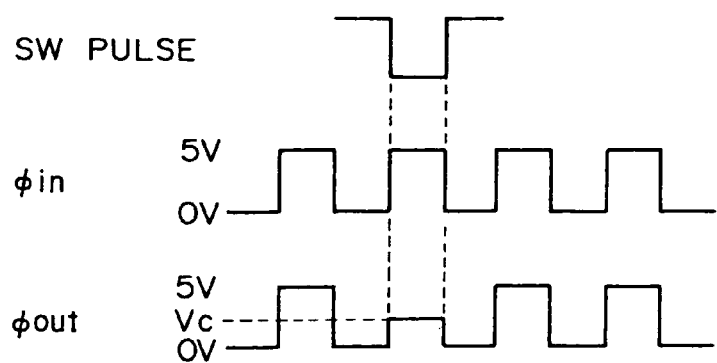

SOLID-STATE IMAGE PICK DEVICE HAVING A TIMING PULSE GENERATOR, AND METHOD FOR REPLACING SIGNALS FROM A SWITCH

BACKGROUND OF THE INVENTION

The present invention relates to a solid state image pickup device in which the charges obtained in a photoelectric converter portion are transferred to a charge/voltage converter portion by predetermined driving pulses, and converted into required voltages to output.

In general, a solid state image pickup device is provided with a row or a plurality of rows of photoelectric converter portions and the charges obtained there are transferred to a charge/voltage converter portion for outputting a voltage signal thus obtained.

The charges are transferred using predetermined clock pulses. The clock pulses necessary for transferring the charges are listed as follows;

(1) A readout-gate-pulse from the photoelectric converter portion to a CCD (Charge Coupled Device) register, (2) A transfer pulse for transferring the charges obtained in the photoelectric-converter portion to the charge/voltage converter portion, (3) A transfer pulse in the last stage right before the charge/voltage converter portion, and (4) A reset pulse in the charge/voltage converter portion.

In a case, these clock pulses are supplied from an external apparatus, or in another case that only a certain kind of clock pulse is supplied from an external apparatus and the other clock pulses necessary for transferring the charges are generated by a timing generator and a driver inside the device.

However, in a solid state image pickup device as mentioned in the above, in a case where a user wants to drive the device at a different timing within the conditions allowed to use the solid state sensor device, or in another case where a user wants to use only a part of the plurality of photoelectric converter portions, sometimes the revision of an external circuit is needed by supplying clock pulses thereto, or an influence of a signal supplied from an external apparatus may exert on the clock pulses generated by an internal timing generator.

Besides, in the case where a user wants to use only a part of the plurality of photoelectric converter portions, the clock pulses from an external apparatus intended to supply only to a part of the portions can be delivered to all pixels in the photoelectric converter portion, and in particular in a case where high speed transfer is needed, since the load capacity of the transfer pulses becomes as much as the load capacity for all CCD registers, a physical restriction can be produced.

SUMMARY OF THE INVENTION

It is an object of the present invention to provide a solid state image pickup device for solving the abovementioned problem.

In order to achieve the object described in the above, according to an aspect of the present invention, there is provided a solid state image pickup device being provided with a photoelectric converter portion being composed of a plurality of pixels disposed in a row, a charge transfer portion for transferring the charges generated in the photoelectric converter portion with predetermined driving pulses, and a charge/voltage converter portion for converting the charges transferred by the charge transfer portion into voltages, comprising; a timing pulse generator portion for generating at least more than one pulse signal from among the following pulse signals: a first pulse signal for driving the charge transfer portion, a second pulse signal for reading out the charges generated in the photoelectric converter portion, a third pulse signal for sweeping out the charges generated in the photoelectric converter portion and a fourth pulse signal for discharging the charges transferred to the charge/voltage converter portion, and a switch circuit for switching over at least a pulse signal out of the abovementioned pulse signals to a predetermined fixed potential or a floating level, or vice versa.

According to another aspect of the present invention, there is provided a driving method for a solid state image pickup device being provided with a photoelectric converter portion being composed of a plurality of pixels disposed in a row, a charge transfer portion for transferring the charges generated in the photoelectric converter portion and a charge/voltage converter portion for converting the charges transferred by the charge transfer portion into corresponding voltages, wherein in a first mode, a first pulse signal for driving the charge transfer portion, a second pulse signal for reading out the charges generated in the photoelectric converter portion, a third pulse signal for sweeping out the charges generated in the photoelectric converter portion and a fourth pulse signal for discharging the charges transferred to the charge/voltage converter portion are supplied to the solid state image pickup device, and in a second mode, at least one pulse signal out of the signal pulses, the first, the second, the third or the fourth, is changed over to a predetermined fixed potential or a floating level.

According to a further aspect of the present invention, there is provided a driving method for a solid state image pickup device being provided with a plurality of photoelectric converter portions being composed of a plurality of pixels in a row, and a plurality of charge transfer portions for transferring the charges generated in respective pixels disposed in a row in the plurality of photoelectric converter portions with predetermined driving pulses, wherein in a first mode, the driving pulses are supplied to all of the plurality of the charge transfer portions, and in a second mode, the driving pulses to be supplied to at least one charge transfer portion out of the plurality of charge transfer portions are switched over to a predetermined fixed potential or a floating level.

Consequently, a solid state image pickup device according to the present invention has effects as shown in the following. In a case where a user wants to drive the device with a timing different from the present one using ordinary driving pulses, the ordinary driving pulses can be easily switched over to a predetermined fixed potential or a floating level with a switch circuit, which makes it possible to operate the device accurately at a different timing from the present one. Further, it is made possible to suspend the operation of an unnecessary pulse signal, while making it possible to control the generation of noise whose pulse signal overlaps on the output waveform.

Further, it is made possible to lower the power consumption in suspending the driver operation by fixing unnecessary pulse signals at a predetermined potential. Even in a case where only a part of the plurality of photoelectric converter portions are used, the pulse signals to be used for the unused photoelectric converter portions are suspended, so that the load capacity of the charge transfer portion can be lowered, thereby making it possible to correspond to a high speed transfer operation.

BRIEF DESCRIPTION OF THE DRAWINGS

FIGS. 2A and 2B show the circuit diagrams for explaining a switch circuit:

FIG. 3 shows a timing chart of input and output pulses in the switch circuit;

DESCRIPTION OF THE PREFERRED EMBODIMENTS

Figure 1:
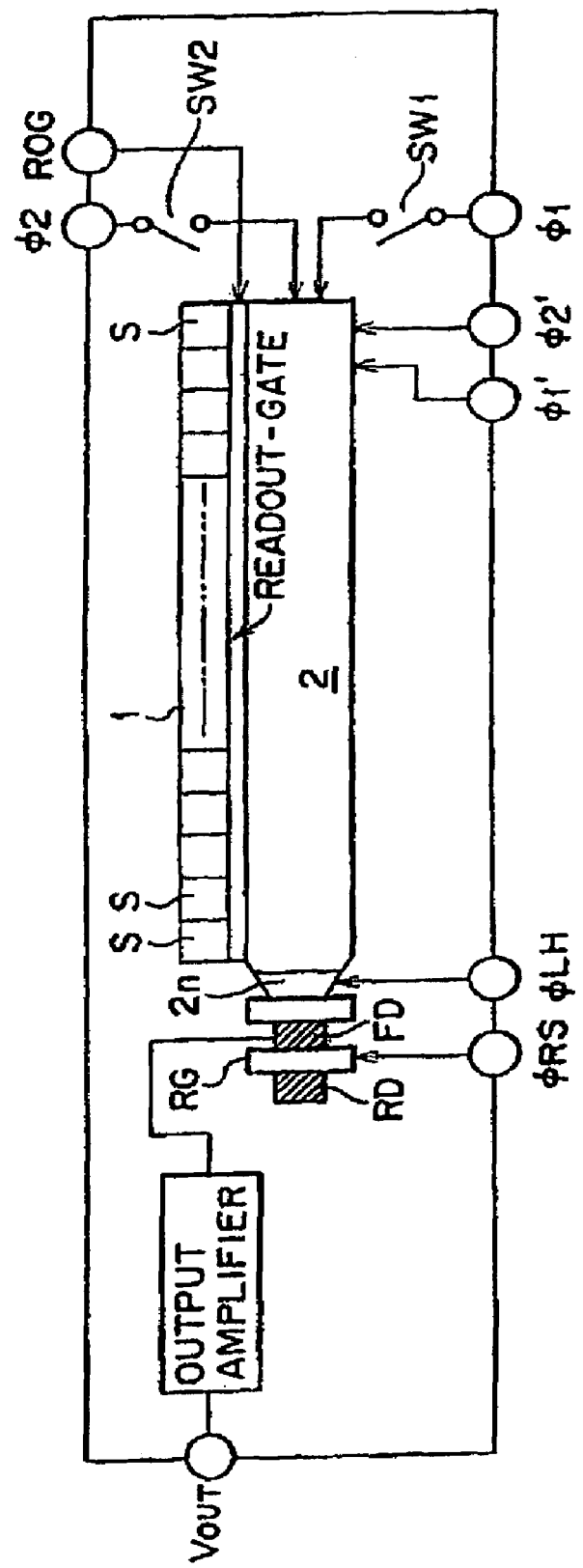
FIG. 1 shows a block diagram for explaining a solid state image pickup device according to a first embodiment.

In the following, the preferred embodiments of a solid state image pickup device according to the present invention will be explained referring to the drawings. FIG. 1 shows a block diagram for explaining the solid state image pickup device according to the first embodiment. The solid state image pickup device is provided with a photoelectric converter portion 1 being composed of a plurality of pixels disposed in a row, a CCD-analog-shift-register 2 serving as a charge transfer portion, for transferring the charges generated in the photoelectric converter portion 1 with predetermined driving pulses, Φ1 and Φ2, a timing pulse generator portion (not shown) for generating driving pulses Φ1, Φ2, etc., and switch circuits SW1 and SW2 for switching the levels of the driving pulses Φ1 and Φ2 to be supplied to the CCD-analog-shift-register 2.

The solid state image pickup device is supplied with, besides driving pulses Φ1 and Φ2 a pulse signal ROG to be supplied to a readout-gate, a pulse signal ΦLH to be supplied to the last stage 2n of the CCD-analog-shift-register 2, a pulse signal ΦRS to be supplied to a reset gate RG, and driving pulses Φ1' and φ2', having period different from that of the driving pulses Φ1 and Φ2. The round marks shown in the drawings indicate terminals provided on a substrate.

In this place, switch circuits SW1 and SW2 will be explained. In the following explanation, although a switch circuit SW1 is taken as an example, a switch circuit SW2 has the same constitution as that of the switch circuit SW1.

FIGS. 2A and 2B show circuit diagrams for explaining the switch circuit. FIG. 2A shows a switch circuit for selecting a Φin or a predetermined potential Vc, and FIG. 2B shows a switch circuit for selecting a Φin or a floating level.

In an example shown in FIG. 2A, the switch circuit SW1 is composed of two MOS transistors TrA and TrB and an inverter. FIG. 3 shows a timing chart showing the relation between the switch pulse (SW pulse) and the Φin or the Φout in the switch circuit.

In the switch circuit SW1 shown in FIG. 2A, when a SW pulse is at a High level, the High level pulse is applied to the gate of the MOS transistor TrA as it is, and to the gate of the MOS transistor TrB, a Low level pulse obtained by reversing the High level pulse in the inverter is applied. As a result, the MOS transistor TrA becomes a closed state and the MOS transistor TrB becomes an opened state, accordingly, Φin is output as it is as a Φout.

On the contrary, when a SW pulse is at a Low level, the Low level pulse is applied to the gate of the MOS transistor TrA as it is, and to the gate of the MOS transistor TrB, a High level pulse obtained by reversing the Low level pulse in the inverter is applied. As a result, the MOS transistor TrA becomes an opened state and the MOS transistor TrB becomes a closed state, accordingly, predetermined potential Vc to be applied to the source of the transistor TrB is output as a Φout.

The switch circuit SW1 shown in FIG. 2B is composed of one MOS transistor Tr. In this switch circuit SW1, when a High level SW pulse is applied to the gate of the MOS transistor Tr, the MOS transistor Tr becomes a closed state and a Φin is output as it is as a Φout. When a Low level SW pulse is applied to the gate of the MOS transistor Tr, the MOS transistor Tr becomes an opened state and the Φin is cut off and the Φout becomes a floating level.

It is made possible to select the driving pulses Φ1 and Φ2 a predetermined voltage or a floating level to be supplied to the CCD-analog-shift-register 2 by providing the switch circuits SW1 and SW2 between the terminals of the driving pulses Φ1 and Φ2, and the CCD-analog-shift-register 2 as shown in FIG. 1.

In other words, when the transfer of the charges is performed using the driving pulses Φ1 and Φ2, the switch circuits SW1 and SW2 are kept in a closed state. Thereby, driving pulses Φ1 and Φ2 can be applied to the CCD-analog-shift-register 2.

In short, the charge accumulated in each pixel S in the photoelectric converter portion 1 is transferred to the CCD-analog-shift-register 2 by the pulse ROG applied to the readout-gate, and the charge is transferred successively toward the left in the figure by the driving pulses Φ1 and Φ2.

When a pulse signal ΦLH is applied to the last stage 2n, the charge stored in each pixel is sent to a floating diffusion FD serving as a charge/voltage converter portion, and the charge in each pixel is converted into a voltage corresponding to the quantity of the charge stored therein. The converted voltage is output from the output terminal Vout through an output amplifier. The charges sent to the floating diffusion FD are discharged to a reset drain RD by the application of a pulse signal ΦRS to the reset gate RG.

In repeating the abovementioned operation, it is made possible to transfer the charge generated in each pixel and take out the output voltage corresponding to the quantity of the charge generated in each pixel.

On the other hand, in a case where a user does not want to use the Φ1 and Φ2 as driving pulses, the switch circuits SW1 and SW2 are kept in a opened state for a desired arbitrary period of time. Thereby, the output of the switch circuit becomes a predetermined potential Vc or a floating level as shown in FIGS. 2A and 2B, and for the desired period of time, the driving pulses Φ1' and Φ2' can be applied to the CCD-analog-shift-register 2.

In short, driving pulses Φ1' and Φ1' can be applied to the CCD-analog-shift-register 2 without being influenced by driving pulses Φ1 and Φ2, and in the same way as the above case, it is possible to perform the transfer of the charge and obtain the output of the corresponding voltage.

As described in the above, in the solid state image pickup device according to the first embodiment, the switching of the potential of driving pulses can be easily performed by switching the circuits SW1 and SW2, and further in a case where other driving pulses Φ1' and Φ2' are used, the influence exerted by the driving pulses Φ1 and Φ2 can be eliminated. In addition, any change in the constitution of the timing pulse generator portion (not shown) for generating the driving pulses Φ1 and Φ2 is not needed, so that there is no need to design a new circuit.

In the first embodiment, an example has been explained, in which the switch circuits SW1 and SW2 are provided on the lines of the driving pulses Φ1 and Φ2, for switching over the driving pulses Φ1 and Φ2 to a predetermined potential Vc or a floating level, however, it is also possible to provide switch circuits on other pulse lines for switching over the other driving pulses to the potential Vc or a floating level.

For example, when the switch circuits are provided on the line of the pulse ROG to be applied to the readout-gate, it becomes possible to perform readout at another timing. In the similar way, by providing the switch circuits on the line of the pulse ΦLH, the charge transfer in the floating diffusion FD can be performed at a yet another timing.

In the similar way, by providing the switch circuits on the line of the pulse ΦRS, the discharge of the charge can be performed at a still further timing. When the switch circuits are provided on the line of a sweeping-out-gate-pulse (shutter pulse), not shown in a drawing, the sweeping out of the charge can be performed at an additional timing.

Figure 4:
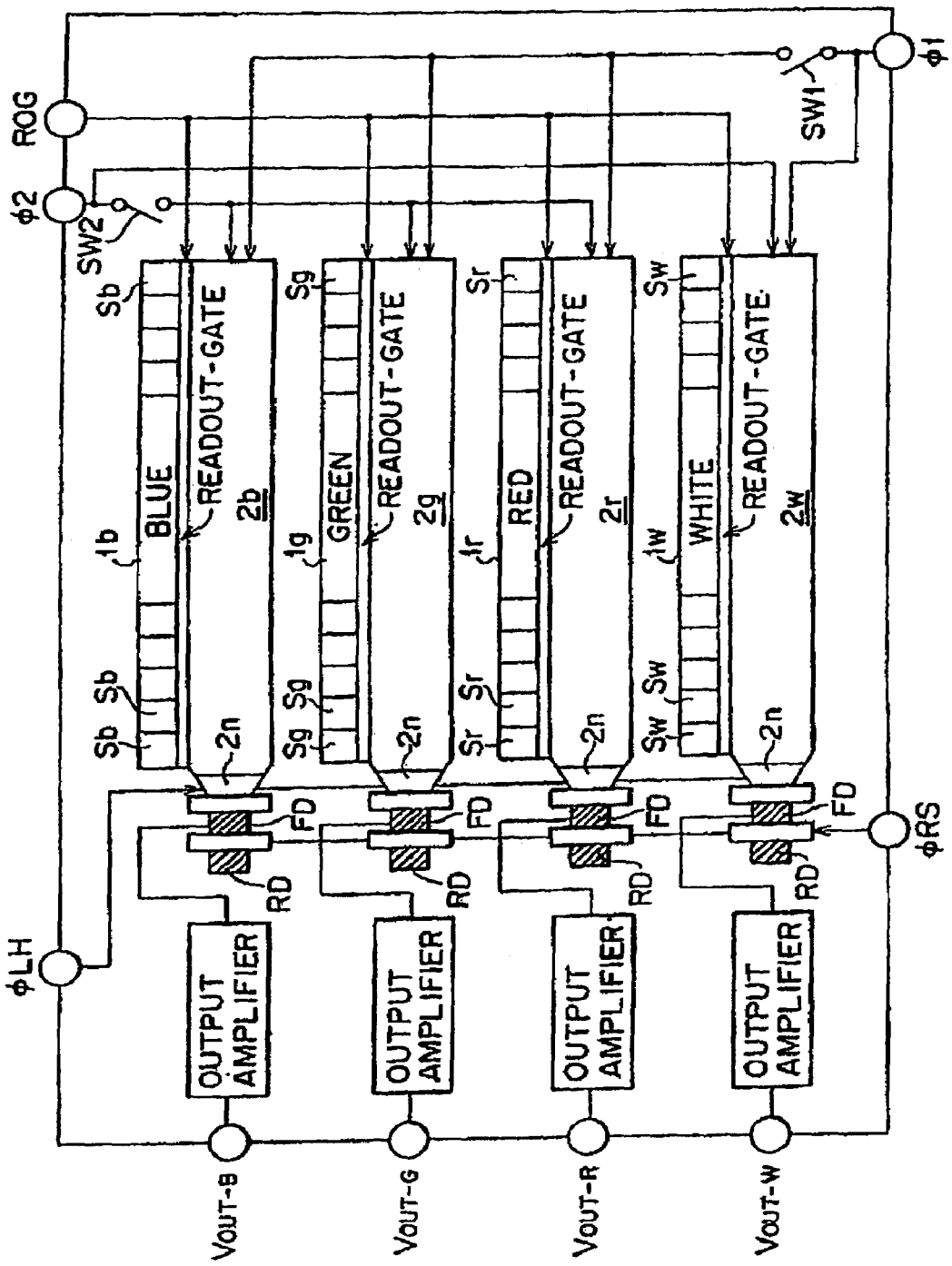
FIG. 4 shows a block diagram for explaining the solid state image pickup device according to a second embodiment.

Next, a second embodiment will be explained referring to FIG. 4. A solid state image pickup device according to the second embodiment comprises a plurality of photoelectric converter portions $1b$, $1g$, $1r$ and $1w$, each being composed of a plurality of pixels in a row, a plurality of CCD-analog-shift-registers $2b$, $2g$, $2r$ and $2w$, for transferring the charges generated in respective photoelectric converter portions $1b$, $1g$, $1r$ and $1w$, timing pulse generator portions (not shown) for generating driving pulses Φ1 and Φ2, etc. and switch circuits SW1 and Sw2, for switching the levels of the driving pulses Φ1 and Φ2.

The photoelectric converter portion $1b$ is composed of a plurality of pixels in a row Sb coated with blue filters (not shown) and obtains the charges corresponding to the blue color. The photoelectric converter portion $1g$ is composed of a plurality of pixels in a row Sg coated with green filters (not shown) and obtains the charges corresponding to the green color. Further, the photoelectric converter portion $1r$ is composed of a plurality of pixels in a row Sr coated with red filters (not shown) and obtains the charges corresponding to red color. The photoelectric converter portion $1w$ is composed of a plurality of pixels in a row with no color filter coated thereon and it transfers charges as a black and white sensor.

In the solid state image pickup device described as above, the line of the driving pulses Φ1 and Φ2 is branched to two lines: one is the line to supply pulses to the CCD-analog-shift-registers $2b$, $2g$ and $2r$, corresponding to blue, green and red, and the other is the line to supply pulses to the CCD-analog-shift-register $2w$ corresponding to the black and white sensor. The switch circuits SW1 and SW2 are provided only on the line of the driving pulses Φ1 and Φ2 for supplying pulses to the CCD-analog-shift-registers $2b$, $2g$ and $2r$, corresponding blue, green and red respectively. The constitution of these switch circuits SW1 and SW2 are identical to those explained in the first embodiment (refer to FIGS. 2A, 2B and 3.)

In a case where color sensors (photoelectric converter portions, $1b$, $1g$ and $1r$, corresponding to blue, green and red) of comparatively low operating frequency are used, (normally, the output frequency of blue, green or red is in the range of 1 MHz to 5 MHz.), the switch circuits SW1 and SW2 are kept in a closed state. Thereby, the driving pulses Φ1 and Φ2 are applied to all CCD-analog-shift-registers $2b$, $2g$, $2r$ and $2w$.

In short, in this case, the total load of all CCD-analog-shift-registers $2b$, $2g$, $2r$ and $2w$ becomes the load capacity of the driving pulses, however, in the case of the transfer of the charges using color sensors, since the operating frequency of these is comparatively low as described in the above, the shift registers are able to correspond well enough.

In other words, the charges accumulated in respective pixels Sb, Sg, Sr and Sw in the photoelectric converter portions $1b$, $1g$, $1r$ and $1w$, respectively, are transferred to the respective CCD-analog-shift-registers $2b$, $2g$, $2r$ and $2w$ by the ROG pulses applied to the readout-gate, and they are transferred successively toward the left in the drawing by the driving pulses Φ1 and Φ2.

When the pulse ΦLH is applied to the last stage $2n$, the charge generated in every pixel corresponding to every color is sent to the floating diffusion FD serving as the charge/voltage converter portion, and each of them is converted into a voltage corresponding to the quantity of the charge. These voltages are output from output terminals, Vout-B, Vout-G, Vout-R and Vout-w, through respective output amplifiers. The charges sent to the floating diffusion FD are discharged to the reset drain RD by the application of a pulse ΦRS to the reset gate RG. When the output for a color picture is to be obtained, the signal corresponding to black and white output from the output terminal Vout-w is not used.

By the repetition of the above operation, it is made possible to transfer the charge generated in each pixel and take out the output voltage corresponding to each color.

On the other hand, when the black and white sensor (photoelectric converter portion $1w$) is used aiming at high speed transfer (normally equal to or higher than 5 MHz), the switch circuits SW1 and SW2 are kept in a opened state. Thereby, the driving pulses Φ1 and Φ2 are not applied to the CCD-analog-shift-registers $2b$, $2g$ and $2r$ corresponding to color sensors, and the voltage to be applied to it becomes a predetermined voltage Vc (refer to FIG. 2.) or a floating level, and the driving pulses Φ1 and Φ2 are applied only to the CCD-analog-shift-register $2w$.

In short, in this case, only the load of the CCD-analog-shift-register $2w$ corresponding to black and white becomes the load capacity of the driving pulses, so that the shift register is able to correspond well enough to the transfer of the charges for black and white aiming at the high speed transfer.

In other words, the charges accumulated in respective pixels Sb, Sg, Sr and Sw in the photoelectric converter portions $1b$, $1g$, $1r$ and $1w$ are transferred to the CCD-analog-shift-registers $2b$, $2g$, $2r$ and $2w$, respectively, by the pulse ROG applied to the readout-gates. However, only the charges transferred to the CCD-analog-shift-register $2w$, to which the driving pulses Φ1 and Φ2 are applied, are transferred successively toward the left in the drawing.

When the pulse ΦLH is applied to the last stage $2n$, the charge in every pixel corresponding to black and white is transferred to the floating diffusion FD, serving as a charge/voltage converter portion, and the charge is converted into a voltage corresponding to the quantity of the charge of black and white by the floating diffusion FD. The voltage is output from the output terminal Vout-w through an output amplifier. The charges sent to the floating diffusion FD are discharged to the reset drain RD by the application of a pulse ΦRS to the reset gate RG.

In repeating the operation mentioned in the above, the charge generated in every pixel corresponding to black and white can be transferred to the CCD-analog-shift-register $2w$ and the output voltage can be taken out from it. In short, a signal corresponding to black and white can be obtained at a high speed.

In the abovementioned second embodiment, a device being provided with four photoelectric converter portions $1b$, $1g$, $1r$ and $1w$, and four CCD-analog-shift-registers $2b$, $2g$, $2r$ and $2w$ each corresponding to blue, green, red and white was explained, however, the present invention is not limited to the above, and the invention can be applied to a device being provided with other number of photoelectric converter portions.

For example, in a case where a user wants to obtain a color picture with a device being provided with three photoelectronic converter portions and CCD-analog-shift-registers corresponding to blue, green, and red, driving pulses are supplied to all these CCD-analog-shift-registers, and when he/she wants to obtain a black and white picture, for example, a switch circuit is so constituted that the driving pulses are supplied only to a CCD-analog-shift-register corresponding to, for example, green. Thereby, with a device being provided with only color sensors, a color picture can be naturally obtained and also pictures of black and white can be obtained at a high speed.

As many apparently widely different embodiments of this invention may be made without departing from the spirit and scope thereof, it is to be understood that the invention is not limited to the specific embodiments thereof except as defined in the appended claims.

What is claimed is:

1. A solid state image pickup device provided with a photoelectric converter portion having a plurality of pixels disposed in a row, a charge transfer portion for transferring the charges generated in said photoelectric converter portion, a charge/voltage converter portion for converting the charges transferred by said charge transfer portion into voltages comprising:
    a transfer register;
    a first switch circuit operable to selectively connect a first input of the transfer register to one of a group comprised of a first pulse signal and a float level; and
    an alternative driving source signal which is operable to drive the first input of the transfer register after the first switch circuit switches to the float level.

2. The solid state image pickup device according to claim 1, further comprising:
    a second switch circuit operable to selectively connect a second input of the transfer register to one of a group comprised of a second pulse signal and a fixed voltage level.

3. A method for driving a read-out of a solid state image pickup device provided with a photoelectric converter portion having a plurality of pixels in a row, a charge transfer portion for transferring the charges generated in said photoelectric converter portion, a charge/voltage converter portion for converting the charges transferred by said charge transfer portion into voltages, wherein
    in a first mode, a first pulse signal for driving said charge transfer portion, a second pulse signal for reading out the charges generated from said photoelectric converter portion to said charge transfer portion, a third pulse signal for sweeping out the charges generated in said photoelectric converter portion, and a fourth pulse signal for discharging the charges transferred to said charge/voltage converter portion, are all selectively supplied to said solid state image pickup device,
    in a second mode, selectively replacing at least one of the first through fourth pulse signals with a floating level and subsequently applying a different pulse signal to the same input at which said one pulse signal is replaced with the floating level.

4. A method for driving a read-out of a solid state image pickup device provided with a plurality of photoelectric converter portions being arranged in a plurality of rows, each row composed of a plurality of pixels, and a plurality of charge transfer portions for transferring the charges generated in respective rows of pixels, wherein,
    a switch circuit selects between two modes, comprising:
    a first mode in which the switch circuit passes drive pulses generated by a pulse generator to the charge transfer portions, and
    a second mode in which the switch circuit replaces at least one of the drive pulses with a floating level, and wherein
    a different driving pulse is subsequently applied to the same input at which the driving pulse is replaced with the floating level.

5. The solid state image pickup device of claim 1, wherein all of the drive pulse signals are replaced.

6. A solid state image pickup device being provided with a plurality of photoelectric converter portions arranged in a plurality of rows, each row having a plurality of pixels, a plurality of charge transfer portions for transferring the charges generated in said photoelectric converter portions, and a plurality of charge/voltage converter portions for converting the charges transferred by each charge transfer portion into voltages, further comprising:
    a first switch circuit operable to selectively connect a first input of at least one of the transfer portions to one of a group of signals comprised of: a first pulse signal and a float level; and
    an alternative driving source signal which is operable to drive at least one of the transfer portions after the first switch circuit switches to the floating level.

7. The solid state image pickup device according to claim 6, further comprising:
    a second switch circuit operable to selectively connect a second input of at least one of the transfer registers to one of a group of signals comprised of: a second pulse signal and a fixed voltage level.

8. A solid-state image pick-up device comprising:
    a timing pulse generator;
    a signal transfer device and switching circuitry connected between the timing pulse generator and the signal transfer device wherein the switching circuitry is operable to selectively connect an input of the signal transfer device to one of a group comprised of: the timing pulse generator and a floating level, and
    an alternative driving source signal which is operable to drive the input of the signal transfer device after the switching circuit switches to the floating level.

* * * * *